(12) United States Patent
Zhou et al.

(10) Patent No.: US 10,619,991 B2
(45) Date of Patent: Apr. 14, 2020

(54) VERTICAL SHAFT STEEL WIRE ROPE CAGE GUIDE SLIDING SLEEVE DEVICE AND DETECTION METHOD THEREOF

(71) Applicants: CHINA UNIVERSITY OF MINING AND TECHNOLOGY, Xuzhou (CN); XUZHOU ZHIRUN MINING EQUIPMENT SCIENCE AND TECHNOLOGY CO., LTD, Xuzhou (CN)

(72) Inventors: Gongbo Zhou, Xuzhou (CN); Zhencai Zhu, Xuzhou (CN); Gang Shen, Xuzhou (CN); Yuan Sun, Xuzhou (CN); Qiao Gao, Xuzhou (CN); Chaoquan Tang, Xuzhou (CN); Ping Zhou, Xuzhou (CN); Gang Zhang, Xuzhou (CN); Wei Li, Xuzhou (CN); Guohua Cao, Xuzhou (CN); Yuxing Peng, Xuzhou (CN); Songyong Liu, Xuzhou (CN); Fan Jiang, Xuzhou (CN); Xin Zhang, Xuzhou (CN)

(73) Assignees: CHINA UNIVERSITY OF MINING AND TECHNOLOGY, Xuzhou (CN); XUZHOU ZHIRUN MINING EQUIPMENT SCIENCE AND TECHNOLOGY CO., LTD, Xuzhou (CN)

(*) Notice: Subject to any disclaimer, the term of this patent is extended or adjusted under 35 U.S.C. 154(b) by 0 days.

(21) Appl. No.: 16/334,749

(22) PCT Filed: Sep. 21, 2018

(86) PCT No.: PCT/CN2018/106890
§ 371 (c)(1),
(2) Date: Mar. 20, 2019

(87) PCT Pub. No.: WO2019/140939
PCT Pub. Date: Jul. 25, 2019

(65) Prior Publication Data
US 2019/0376780 A1 Dec. 12, 2019

(30) Foreign Application Priority Data
Jan. 17, 2018 (CN) .......................... 2018 1 0044054

(51) Int. Cl.
G01B 7/00 (2006.01)
G01B 7/06 (2006.01)
B66B 19/06 (2006.01)

(52) U.S. Cl.
CPC ............... *G01B 7/06* (2013.01); *B66B 19/06* (2013.01)

(58) Field of Classification Search
CPC ... G01B 7/00; G01B 7/06; G01B 7/20; G01N 27/00; E21B 2034/007; E21B 34/14; B66B 19/06; B66B 5/20
See application file for complete search history.

(56) References Cited

U.S. PATENT DOCUMENTS

| 5,258,930 | A | * | 11/1993 | Fukuyoshi | G01B 7/10 |
| | | | | | 702/38 |
| 5,559,571 | A | * | 9/1996 | Miyamoto | G03B 5/00 |
| | | | | | 396/52 |
| 5,699,241 | A | * | 12/1997 | Fujikawa | H02M 3/00 |
| | | | | | 363/141 |

FOREIGN PATENT DOCUMENTS

| CN | 102918374 A | 2/2013 |
| CN | 107178538 A | 9/2017 |

(Continued)

*Primary Examiner* — Vinh P Nguyen
(74) *Attorney, Agent, or Firm* — Bayramoglu Law Offices LLC

(57) ABSTRACT

A vertical shaft steel wire rope cage guide sliding sleeve wear amount detection device includes flexible printed circuit (FPC) flat cable units, voltage detection circuit units, a
(Continued)

control system, and data display equipment. Two end faces of a vertical shaft steel wire rope cage guide sliding sleeve are provided with the FPC flat cable units, the FPC flat cable units being sequentially attached to end portion surfaces of the sliding sleeve along an outer periphery of a rope hole of a steel wire rope to form an enclosure; each FPC flat cable unit is connected to one voltage detection circuit unit; a signal input end of the control system is connected with the voltage detection circuit units, and a signal output end of a control module is connected to a wireless transmission module; and the data display equipment receives data transmitted by the wireless transmission module.

8 Claims, 5 Drawing Sheets

(56) References Cited

FOREIGN PATENT DOCUMENTS

| | | |
|---|---|---|
| CN | 107314735 A | 11/2017 |
| CN | 206863082 U | 1/2018 |
| CN | 108168417 A | 6/2018 |
| EP | 0716290 B1 | 3/2002 |

* cited by examiner

VERTICAL SHAFT STEEL WIRE ROPE CAGE GUIDE SLIDING SLEEVE DEVICE AND DETECTION METHOD THEREOF

CROSS REFERENCE TO THE RELATED APPLICATIONS

This application is the national phase entry of International Application No. PCT/CN2018/106890, filed on Sep. 21, 2018, which claims priority from the Chinese patent application no. 201810044054.6 filed on Jan. 17, 2018, the entire contents of which are incorporated herein by reference.

TECHNICAL FIELD

The present invention belongs to the field of wear detection, and in particular relates to a flexible printed circuit (FPC)-based vertical shaft steel wire rope cage guide sliding sleeve wear amount detection method and device.

BACKGROUND

With the development of China's modern industry, various industries are paying more and more attention to the wear of parts of production equipment or the wear of materials caused by other reasons. When the wear amount of some parts in some equipment exceeds a predetermined value, it will cause certain hazards to the production and will directly affect the output value of a product. For a hoist of a mine vertical shaft steel wire rope cage guide, a guide device, namely a sliding sleeve, thereof is often worn by a steel wire rope. According to the "Coal Mine Safety Regulation", when the wear amount exceeds a certain value, the sliding sleeve needs to be replaced in the case where the distance between an inner wall of the sliding sleeve and the steel wire rope is 15 mm. Therefore, the design of equipment capable of detecting the wear amount of the sliding sleeve in real time can effectively prevent an excessive wear amount from adversely affecting the production, and the position where the wear occurs and a current wear amount can be detected in real time. It is of great significance to the production of modern social industry.

Traditionally, the thickness of parts is detected by sensors. The thickness detection of a traditional sensor usually includes contact detection and non-contact detection, and may be specifically divided into photoelectric coded disc type detection, displacement sensing type detection, ultrasonic type detection, ray type detection, isotope type detection, eddy current type detection, capacitive type detection, laser type detection, etc. The detection principle is mostly the same as its literal meaning, and is to perform corresponding measurement by sound wave, ray, eddy current, etc. But the traditional sensor is sensitive to environmental factors and subject to equipment working conditions, the working form also affects the measurement accuracy, and it is not easy to install the sensor in some small spaces. Therefore, the traditional sensor has great limitations in detection, so it is necessary to design a novel and reliable detection method to make up for deficiencies of the traditional sensors.

Flexible printed circuit (FPC) is a highly reliable and excellent flexible printed circuit made of polyimide or polyester film. It has the characteristics of high wiring density, light weight, thin thickness, and good bending property. The scope of application of a traditional FPC flat cable is mainly used to connect a motherboard and display equipment to play a role in data transmission.

SUMMARY

Technical Problem

To overcome the problems that the existing traditional sensors are sensitive to environmental factors, subject to equipment working conditions, low in stability, high in cost and inconvenient to install, the present invention is directed to a flexible printed circuit (FPC)-based vertical shaft steel wire rope cage guide sliding sleeve wear amount detection device and method, which are novel in detection, free from environmental equipment constraints, stable to work, and low in cost.

Technical Solution

In order to achieve the above objective, the present invention adopts the following technical solutions:
A vertical shaft steel wire rope cage guide sliding sleeve wear amount detection device includes a plurality of flexible printed circuit (FPC) flat cable units, a plurality of voltage detection circuit units, a control system, and data display equipment.
Two end faces of a vertical shaft steel wire rope cage guide sliding sleeve are respectively provided with the plurality of FPC flat cable units, the plurality of FPC flat cable units being sequentially attached to end portion surfaces of the vertical shaft steel wire rope cage guide sliding sleeve along an outer periphery of a rope hole of a steel wire rope, so as to form an enclosure. Each FPC flat cable unit is connected to one voltage detection circuit unit.
The control system includes a control module, a control power supply and a wireless data transmission module, wherein a signal input end of the control module is in signal connection with the plurality of voltage detection circuit units respectively, and a signal output end of the control module is connected to the wireless data transmission module through an output circuit. The control power supply supplies power to the control module.
The data display equipment includes a data receiving module and a host computer, and the host computer receives data transmitted by the wireless data transmission module through the data receiving module.
Each of the voltage detection circuit units includes a PCB, a divider resistor and a detection circuit unit power supply, wherein the PCB is composed of an FPC flat cable socket and chip resistors, the number of slots of the FPC flat cable socket is the same as the number of copper wires on the FPC flat cable unit, one end of each chip resistor is connected to a single output pin of the FPC flat cable socket, and the other end is concentrated at a point for output. Each of the FPC flat cable units has a first output end and a second output end, the first output end of the FPC flat cable unit is a PI-enhanced output end, the PI-enhanced output end is connected to the FPC flat cable socket on the PCB, and an output end of the PCB is sequentially connected to the divider resistor, the voltage detection circuit unit power supply and the second output end of the FPC flat cable in series through a wire to form a voltage detection circuit unit.

The two end faces of the vertical shaft steel wire rope cage guide sliding sleeve are further fixedly connected to a voltage detection circuit unit housing, and all the voltage detection circuit units are fixed in the voltage detection circuit unit housing.

Each FPC flat cable unit arranges copper wires of 0.1 mm, an innermost circular arc segment has a diameter of 40 mm, the copper wires are arrayed at an equal interval of 1 mm, and there are ten circular arc-shaped copper wires.

The control module is an STM32 single-chip microcomputer.

The STM32 single-chip microcomputer includes an STM32 chip, a reset circuit, a clock circuit, a serial communication circuit, and a wireless data transmission module. The reset circuit and the clock circuit are connected to an NRST pin of the STM32 chip and XTAL1 and XTAL2 pins respectively to form a single-chip microcomputer minimum system.

The serial communication circuit is connected to PC0, PC1, PC2, PC3, PC4, PC5, PB0, PB1 and GND ports of the STM32 chip to achieve voltage collection of a plurality of external voltage detection circuit units.

The wireless data transmission module is connected to an ATK MODULE pin of the STM32 to wirelessly send out data obtained by the STM32 chip during operation.

A wear amount detection method based on the vertical shaft steel wire rope cage guide sliding sleeve wear amount detection device includes:

a, starting the detection device before a hoist runs;

b, connecting a plurality of voltage detection circuit units to a control system, and continuously reading, by the control system, data and sending the data to a wireless data transmission module;

c, when a sliding sleeve wears in a certain direction, breaking copper wires in one of FPC flat cable units in a plurality of voltage detection circuit units, wherein the number of the broken copper wires in the FPC flat cable unit is different according to different thickness of wear, a voltage value detected by a voltage detection circuit unit corresponding to the FPC flat cable unit is reduced, and a control system obtains voltage values of both ends of a divider resistor in real time, which are sent out through a wireless data transmission module, obtained by a data receiving module and then transmitted to a host computer; and d, obtaining, by the host computer, a current wear amount by comparing the variations of data according to a relationship between voltage readings of both ends of the divider resistor and wear amounts, and obtaining a position where the wear occurs according to the variation of each voltage reading in the plurality of voltage detection circuit units, so as to display a current worn position in real time.

There are eight FPC flat cable units, two end faces of a vertical shaft steel wire rope cage guide sliding sleeve are provided with four FPC flat cable units separately, and the four FPC flat cable units are sequentially attached to end portion surfaces of the vertical shaft steel wire rope cage guide sliding sleeve along an outer periphery of a rope hole of a steel wire rope, so as to form an enclosure.

Advantageous Effect (1) The present invention is advantaged by compact structure, simple operation, convenient installation, convenient maintenance, safety, reliability, and low cost.

(2) Compared with a traditional sensor detection system, the device of the present invention uses an FPC flat cable for detecting a wear amount in a novel detection manner, is not highly sensitive to environmental factors, is not subject to equipment working conditions and influence of the working form on measurement accuracy, and is easy to use in some small places where a sensor cannot be conveniently installed.

(3) A user may observe with data display equipment, the detection device may detect the current wear amount of a sliding sleeve and a position where the wear occurs in real time, and the data display is intuitive and clear.

(4) A control system adopts an STM32 single-chip microcomputer as a core processor, which can accurately read and transmit data with high control accuracy and good stability.

In the figures: 1, vertical shaft steel wire rope cage guide sliding sleeve; 2, FPC flat cable unit; 3, PCB; 4, divider resistor; 5, voltage detection circuit unit power supply; 6, voltage detection circuit unit housing; 7, data receiving module; 8, host computer; 9, STM32 single-chip microcomputer; 10, control power supply; 11, wireless data transmission module; 12, control system housing; 13, PI-enhanced output end; 14, FPC flat cable socket; 15, chip resistor; 16, steel wire rope; 17, output circuit; 18, second output end; 19, output end of PCB.

DETAILED DESCRIPTION OF THE EMBODIMENTS

The present invention provides a flexible printed circuit (FPC)-based vertical shaft steel wire rope cage guide sliding sleeve wear amount detection method and device. In order to make the purposes, technical solutions and advantages of the present invention clearer, the present invention will be further described by way of embodiments, and is not intended to be limited within the scope of the embodiments.

The vertical shaft steel wire rope cage guide sliding sleeve wear amount detection device of the present invention includes a plurality of FPC flat cable units, a plurality of voltage detection circuit units, a control system, and data display equipment.

Two end faces of a vertical shaft steel wire rope cage guide sliding sleeve are respectively provided with the plurality of FPC flat cable units, the plurality of FPC flat cable units being sequentially attached to end portion surfaces of the vertical shaft steel wire rope cage guide sliding sleeve along an outer periphery of a rope hole of a steel wire rope, so as to form an enclosure; each FPC flat cable unit is connected to one voltage detection circuit unit.

Figure 1:
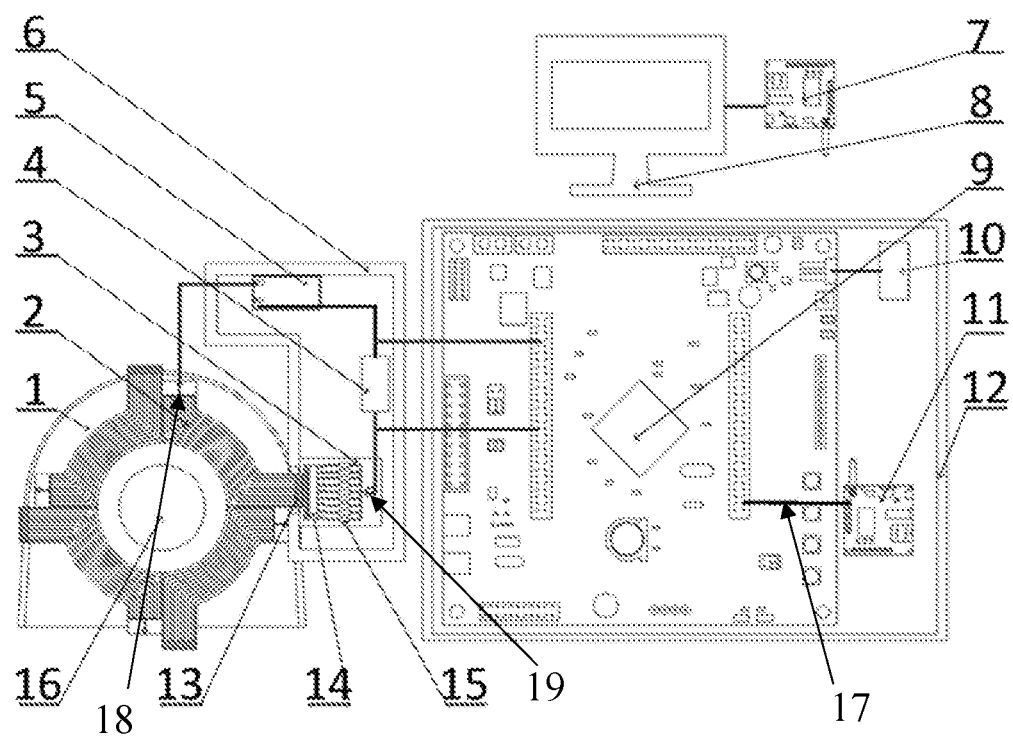
FIG. 1 is an overall schematic view of the present invention.
Figure 2:
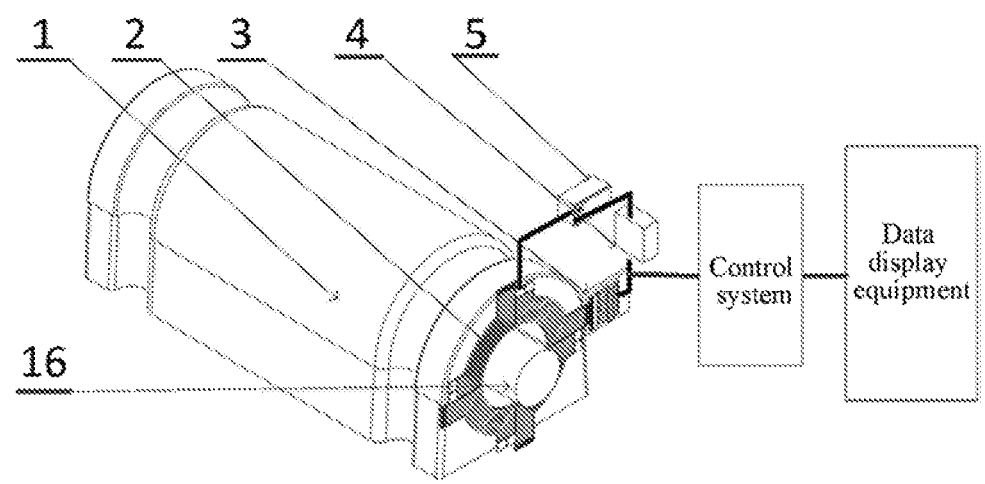
FIG. 2 is an isometric side view of the present invention.
Figure 3:
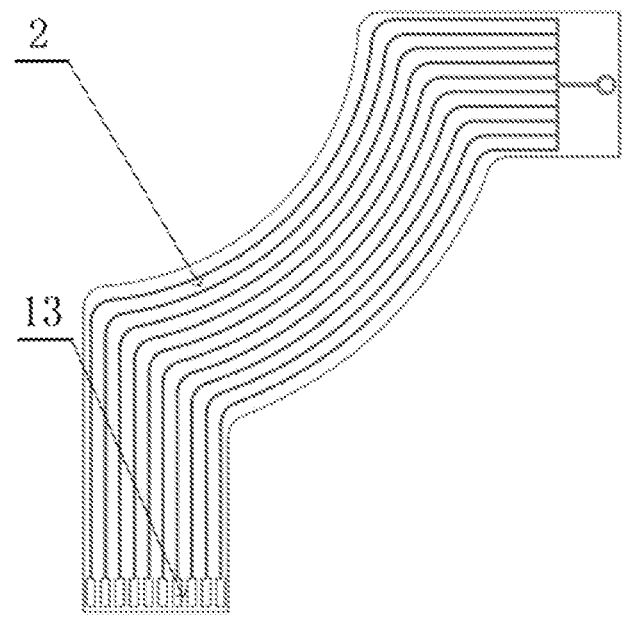
FIG. 3 is a structural view of a flexible printed circuit (FPC) flat cable unit of the present invention.
Figure 4:
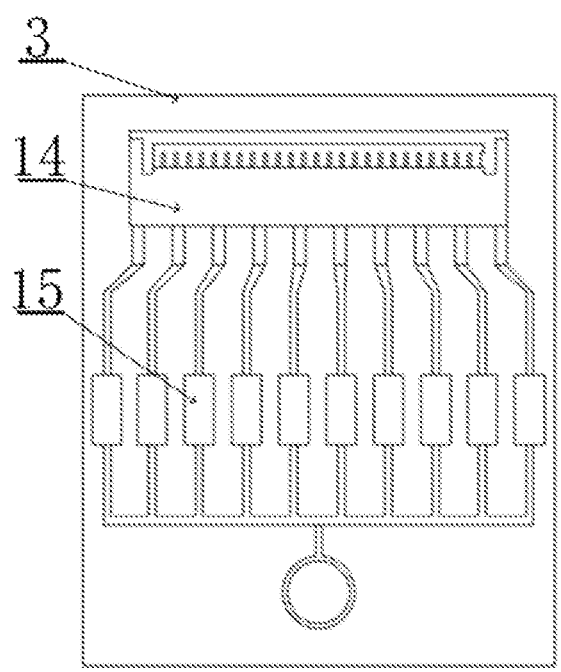
FIG. 4 is a structural top view of a PCB of the present invention.
Figure 5:
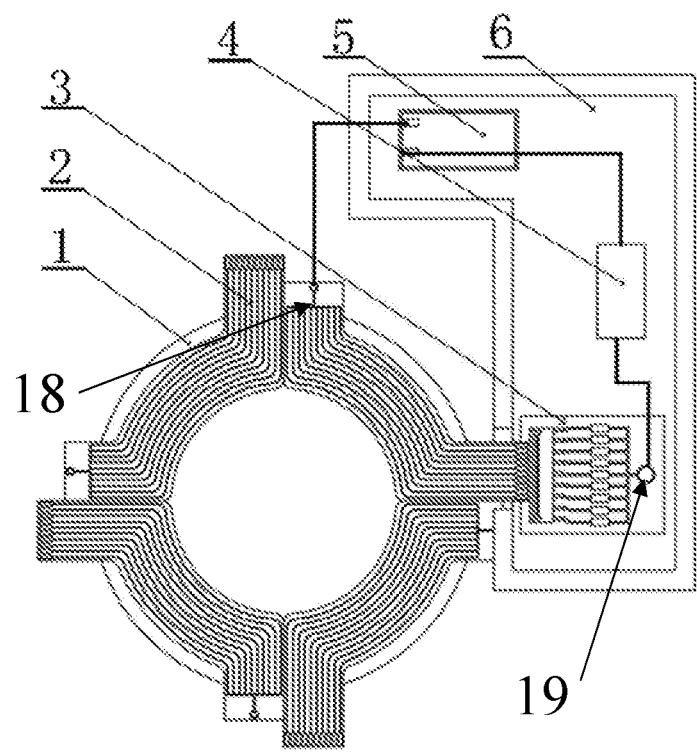
FIG. 5 is a schematic structural view of a voltage detection circuit unit of the present invention.

As shown in FIG. 1, both ends of the vertical shaft steel wire rope cage guide sliding sleeve are fixedly connected to a voltage detection circuit unit housing 6, and the voltage detection circuit unit housing 6 is fixed at both ends of the sliding sleeve according to the installation position of an FPC flat cable.

As shown in FIG. 1, the data display equipment includes a data receiving module 7 and a host computer 8, the data receiving module 7 is connected to the host computer 8, the data receiving module 7 and the host computer 8 may be placed in a data monitoring room, and when running, the equipment is used to detect the running status of the device in real time and perform data display for the wear amount.

As shown in FIG. 1 to FIG. 5, in the present embodiment, there are eight voltage detection circuit units, both ends of the vertical shaft steel wire rope cage guide sliding sleeve are provided with four voltage detection circuit units separately, and each voltage detection circuit unit includes an FPC flat cable unit 2, a PCB 3, a divider resistor 4, and a voltage detection circuit unit power supply 5. Four FPC flat cable units 2 are sequentially attached to the surface of a part to form an enclosure, a PI-enhanced output end 13 of the FPC flat cable unit 2 in each voltage detection circuit unit is connected to the PCB 3 and fixed in the voltage detection circuit unit housing 6, the divider resistor 4 and the voltage detection circuit unit power supply 5 are fixed in the voltage detection circuit unit housing 6 respectively, a non-PI-enhanced output end 13 of the FPC flat cable unit 2 is connected to the divider resistor 4 in series through a wire, the divider resistor 4 and an output end of the PCB 3 are connected to the voltage detection circuit unit power supply 5 respectively, and the FPC flat cable unit 2, the PCB 3, the divider resistor 4 and the voltage detection circuit unit power supply 5 form a closed loop.

In the present embodiment, the FPC flat cable unit 2 is formed by proofing, wherein since the vertical shaft steel wire rope cage guide sliding sleeve 1 is a semi-ring semi-square part having an inner diameter of 40 mm and an outer diameter of 80 mm, an inner wall is worn, and the part needs to be replaced as long as the thickness of wear is greater than 10 mm, so the FPC flat cable unit 2 is also designed in a ring shape, copper wires of 0.1 mm are arranged inside the flat cable, an innermost circular arc segment has a diameter of 40 mm, the copper wires are arrayed at an equal interval of 1 mm, there are ten circular arc-shaped copper wires, an outermost layer has a diameter of 49 mm, one end of the FPC flat cable unit 2 is PI-enhanced to make it connected to the FPC flat cable socket 14, the other end of the FPC flat cable unit 2 connects nine copper wires in parallel to be concentrated at a point for output, and four FPC flat cable units 2 are arranged in a closed annular shape and fixed on an end face of the vertical shaft steel wire rope cage guide sliding sleeve 1.

In the present embodiment, installation of FPC flat cable unit 2: since the sliding sleeve is worn on the inner wall, the diameter of the innermost copper wire inside the designed FPC flat cable unit 2 is the same as the inner diameter of the sliding sleeve, so the innermost copper wire of the FPC flat cable unit and the inner diameter of the sliding sleeve are concentrically installed during installation, and the innermost copper wire segment of the FPC flat cable unit will completely coincide with the inner diameter of the sliding sleeve, so that the final FPC flat cable is closed at the end face of the sliding sleeve.

In the present embodiment, the PCB is composed of an FPC flat cable socket 14 and chip resistors 15, the number of slots of the FPC flat cable socket 14 is the same as the number of copper wires of the FPC flat cable unit, the number of the chip resistors 15 is also the same as the number of the copper wires on the FPC flat cable unit, one end of each chip resistor is connected to a single output pin of the FPC flat cable socket, and the other end is concentrated at a point for output.

Figure 6:
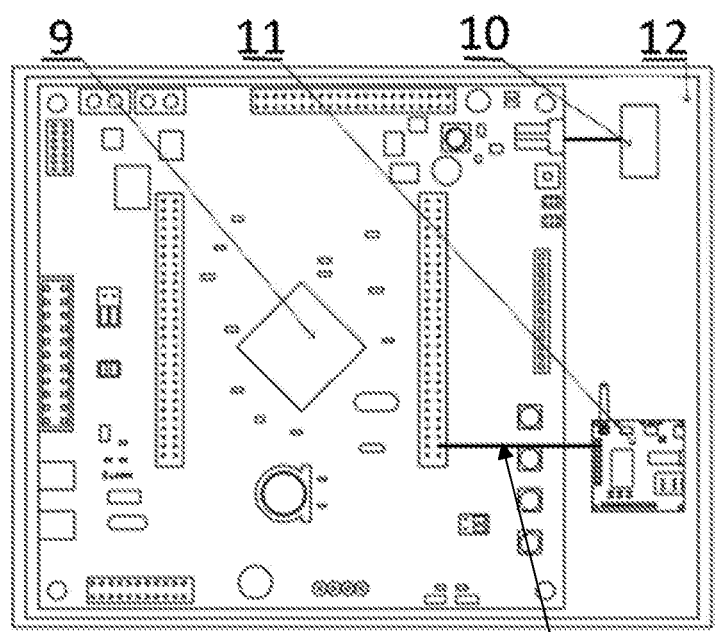
FIG. 6 is a structural view of a control system of the present invention.

As shown in FIG. 6, the control system includes an STM32 single-chip microcomputer 9, a control power supply 10 and a wireless data transmission module 11, the STM32 single-chip microcomputer is connected to both ends of the divider resistor in the voltage detection circuit unit through data lines respectively to read data, and the STM32 single-chip microcomputer is connected to the wireless data transmission module through an output circuit 17 and connected to the control power supply through a power line.

Figure 7:
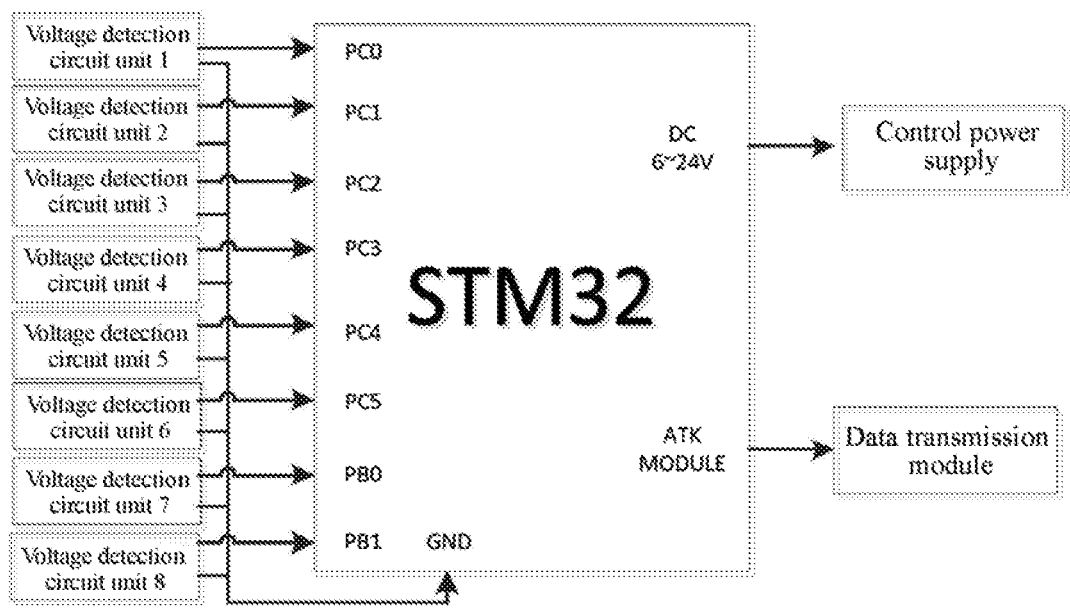
FIG. 7 is a hardware block diagram of an STM32 single-chip microcomputer control system of the present invention.

Further, as shown in FIG. 7, the STM32 single-chip microcomputer control system includes an STM32 chip, a reset circuit, a clock circuit, a serial communication circuit, and a wireless data transmission module. The reset circuit and the clock circuit are connected to an NRST pin of the STM32 chip and XTAL1 and XTAL2 pins respectively to form a single-chip microcomputer minimum system; the serial communication circuit is connected to PC0, PC1, PC2, PC3, PC4, PC5, PB0, PB1 and GND ports of the STM32 chip to achieve voltage collection of eight external voltage detection circuit units; and the wireless data transmission module is connected to an ATK MODULE pin of the STM32 to wirelessly send out data obtained by the STM32 during operation.

In the present embodiment, the working principle of the voltage detection circuit unit is listed as below: in the process of detecting the wear amount, each copper wire inside the FPC flat cable unit is separately connected in series with a chip resistor, and then overall parallel connection is realized; when a copper wire in one of the FPC flat cable units in the four voltage detection circuit units at a single side is broken, that is, when the sliding sleeve is worn in a certain direction, the number of broken copper wires in the FPC is different according to different thickness of the wear, so the chip resistor connected to the broken copper wire is disconnected, the number of parallel-connected resistors is reduced, the total resistance of the circuit is larger, the total current is smaller, and the voltage values of both ends of the divider resistor is smaller; the control system obtains the voltage values of both ends of the divider resistor in real time, which are sent out through the wireless data transmission module, obtained by the data receiving module and then transmitted to the host computer; a current wear amount may be obtained by a relationship between voltage readings of both ends of the divider resistor and wear amounts; and a position where the wear occurs may also be obtained by the variation in each circuit reading in the eight voltage detection circuit units.

Figure 8:
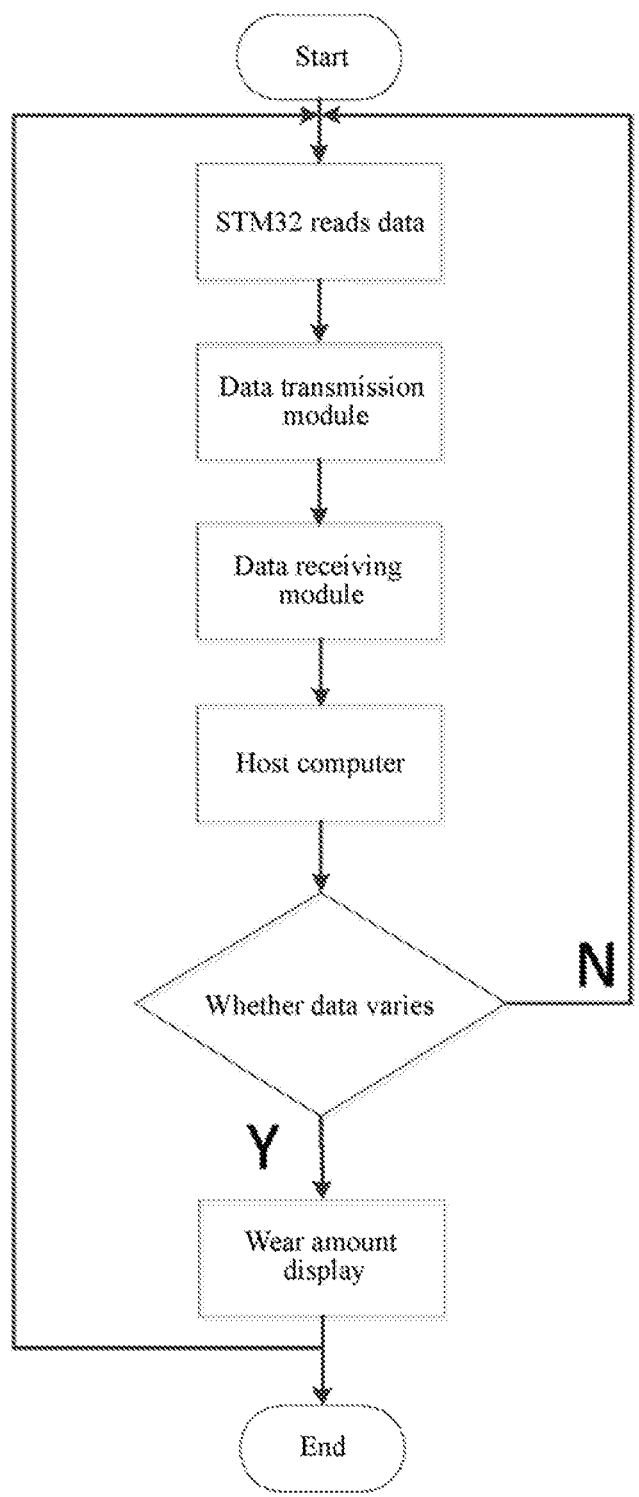
FIG. 8 is a working flowchart of the present invention.

As shown in FIG. 8, the running process of the device includes:

a: starting the detection device before a hoist runs.

b: connect the voltage detection circuit units to the control system, and continuously read, by the control system, data and send the data to the wireless data transmission module.

c: receive, by the data receiving module, information sent out by the transmission module, and then transmit the information to the host computer.

d: display, by the host computer, a current wear amount and a worn position by comparing the variations of the data.

The above is only a preferred implementation of the present invention, and it should be noted that those of ordinary skill in the art can also make several improvements and modifications without departing from the principles of the present invention, which should be regarded as the scope of protection of the present invention.

What is claimed is:

1. A vertical shaft steel wire rope cage guide sliding sleeve wear amount detection device, comprising: a plurality of flexible printed circuit (FPC) flat cable units, a plurality of voltage detection circuit units, a control system, and data display equipment, wherein two end faces of a vertical shaft steel wire rope cage guide sliding sleeve are respectively provided with the plurality of FPC flat cable units, the plurality of FPC flat cable units being sequentially attached to end portion surfaces of the vertical shaft steel wire rope cage guide sliding sleeve along an outer periphery of a rope hole of a steel wire rope, so as to form an enclosure; each FPC flat cable unit is connected to one voltage detection circuit unit;

the control system comprises a control module, a control power supply and a wireless data transmission module, wherein a signal input end of the control module is in signal connection with the plurality of voltage detection circuit units respectively, and a signal output end of the control module is connected to the wireless data transmission module through an output circuit; the control power supply supplies power to the control module; and the data display equipment comprises a data receiving module and a host computer, and the host computer receives data transmitted by the wireless data transmission module through the data receiving module.

2. The vertical shaft steel wire rope cage guide sliding sleeve wear amount detection device according to claim 1, wherein each of the plurality of voltage detection circuit units comprises a PCB, a divider resistor and a detection circuit unit power supply, wherein the PCB is composed of an FPC flat cable socket and chip resistors, a number of slots of the FPC flat cable socket are equal to a number of copper wires on the FPC flat cable unit, one end of each chip resistor is connected to a single output pin of the FPC flat cable socket, and an other end is concentrated at a point for output; and each of the plurality of FPC flat cable units has a first output end and a second output end, the first output end of the each FPC flat cable unit is a PI-enhanced output end, the PI-enhanced output end is connected to the FPC flat cable socket on the PCB, and an output end of the PCB is sequentially connected to the divider resistor, the voltage detection circuit unit power supply and the second output end of the FPC flat cable in series through a wire to form a voltage detection circuit unit.

3. The vertical shaft steel wire rope cage guide sliding sleeve wear amount detection device according to claim 1, wherein the two end faces of the vertical shaft steel wire rope cage guide sliding sleeve are fixedly connected to a voltage detection circuit unit housing, and all of the plurality of voltage detection circuit units are fixed in the voltage detection circuit unit housing.

4. The vertical shaft steel wire rope cage guide sliding sleeve wear amount detection device according to claim 1, wherein each FPC flat cable unit arranges copper wires of 0.1 mm, an innermost circular arc segment has a diameter of 40 mm, the copper wires are arrayed at an equal interval of 1 mm.

5. The vertical shaft steel wire rope cage guide sliding sleeve wear amount detection device according to claim 1, wherein the control module is an STM32 single-chip microcomputer.

6. The vertical shaft steel wire rope cage guide sliding sleeve wear amount detection device according to claim 5, wherein the STM32 single-chip microcomputer comprises an STM32 chip, a reset circuit, a clock circuit, a serial communication circuit, and the wireless data transmission module, and the reset circuit and the clock circuit are connected to an NRST pin of the STM32 chip and XTAL1 and XTAL2 pins respectively to form a single-chip microcomputer minimum system;

the serial communication circuit is connected to PC0, PC1, PC2, PC3, PC4, PC5, PB0, PB1 and GND ports of the STM32 chip to achieve voltage collection of the plurality of voltage detection circuit units; and the wireless data transmission module is connected to an ATK MODULE pin of the STM32 to wirelessly send out data obtained by the STM32 chip during operation.

7. A wear amount detection method based on the vertical shaft steel wire rope cage guide sliding sleeve wear amount detection device according to claim 1, the method comprising:

a, starting the detection device before a hoist runs;

b, connecting a plurality of voltage detection circuit units to a control system, and continuously reading, by the control system, data and sending the data to a wireless data transmission module;

c, when a sliding sleeve wears in a certain direction, breaking copper wires in one of flexible printed circuit (FPC) flat cable units in the plurality of voltage detection circuit units, wherein the number of the broken copper wires in the FPC flat cable unit is different according to different thickness of wear, a voltage value detected by a voltage detection circuit unit corresponding to the FPC flat cable unit is thus reduced, and a control system obtains voltage values of both ends of a divider resistor in real time, which are sent out through the wireless data transmission module, obtained by a data receiving module and then transmitted to a host computer; and d, obtaining, by the host computer, a current wear amount by comparing the variations of data according to a relationship between voltage readings of both ends of the divider resistor and wear amounts, and obtaining a position where the wear occurs according to the variation of each voltage reading in the plurality of voltage detection circuit units, so as to display a current worn position in real time.

8. The wear amount detection method based on the vertical shaft steel wire rope cage guide sliding sleeve wear amount detection device according to claim 7, wherein, the plurality of FPC flat cable units are eight FPC flat cable units, two end faces of a vertical shaft steel wire rope cage guide sliding sleeve are provided with four FPC flat cable units separately, and the four FPC flat cable units are sequentially attached to end portion surfaces of the vertical shaft steel wire rope cage guide sliding sleeve along an outer periphery of a rope hole of a steel wire rope, so as to form an enclosure.

* * * * *